United States Patent [19]

Kobayashi et al.

[11] Patent Number: 5,419,207
[45] Date of Patent: May 30, 1995

[54] DETECTING AND PROCESSING CIRCUITRY FOR MAGNETOSTRICTION TYPE TORQUE SENSOR

[75] Inventors: Nobuaki Kobayashi; Hideki Kano; Hideki Kamioka, all of Atsugi, Japan

[73] Assignee: Unisia Jecs Corporation, Atsugi, Japan

[21] Appl. No.: 68,668

[22] Filed: May 28, 1993

[30] Foreign Application Priority Data

Jun. 1, 1992 [JP] Japan ................................. 4-165305

[51] Int. Cl.⁶ .......................... G01L 3/10; G01B 7/24; G01R 33/18
[52] U.S. Cl. ............................... 73/862.333; 324/209; 324/225; 324/233
[58] Field of Search ............... 324/209, 225, 226, 233, 324/234, 236–242; 73/862.333

[56] References Cited

U.S. PATENT DOCUMENTS

| | | | |
|---|---|---|---|
| 3,319,464 | 5/1967 | Bender | 73/862.333 |
| 3,997,835 | 12/1976 | Ando et al. | 324/207.26 |
| 4,258,319 | 3/1981 | Shimada et al. | 324/226 |
| 5,269,192 | 12/1993 | Utsui et al. | 73/862.333 X |

*Primary Examiner*—Gerard R. Strecker
*Attorney, Agent, or Firm*—Foley & Lardner

[57] ABSTRACT

A detection and processing circuitry of a magnetostriction type torque sensor is disclosed. An alternating current voltage signal Vo is generated and output from an oscillator. A shift circuit shifts a phase of the AC voltage waveform of the oscillator by ¼ period and outputs the phase shifted voltage to a detector. The detector modulates the inverted voltage signal Va on the basis of the phase shifted voltage signal and an integrator integrates the detector output voltage in a time range from $(\alpha - \pi/2)$ to $(\alpha - 3\pi/2)$. Thus, the output voltage signal Vd from the integrator indicates a resistance value of an imaginary part, i.e., inductance of the impedance of the detection coil of a magnetostrictive shaft of the torque sensor which is not dependent on the change in a temperature.

8 Claims, 5 Drawing Sheets

DETECTING AND PROCESSING CIRCUITRY FOR MAGNETOSTRICTION TYPE TORQUE SENSOR

BACKGROUND OF THE INVENTION

The present invention relates generally to a processing circuit for processing an output signal from a sensing device such as a magnetostriction type torque sensor.

A U.S. patent application Ser. No. 7/969,056 (which corresponds to German Patent Application filing No. P 42 374 16. 2 filed on Oct. 23, 1992) exemplifies a previously proposed detecting and processing circuitry for a sensing device such as a magnetostriction type torque sensor applicable to the detection of a torque of, for example, an output shaft of an internal combustion engine.

In the previously proposed processing circuitry of the torque sensor, a detection of the torque is taken in the form of a change in impedance of detection coils installed on an outer periphery of a magnetostrictive shaft of the torque sensor. However, each impedance in the two detection coils is divided into real parts of the impedances, i.e., iron losses $r1$, $r2$ and imaginary parts thereof, i.e., resistances $2\pi fL1$ and $2\pi fL2$ due to inductances of the detection coils. These resistances are temperature dependent not only when the torque is applied about the magnetostrictive shaft but also when the surrounding temperature is changed.

That is to say, since the magnetic characteristic on the magnetostrictive shaft is changed according to the surrounding temperature, this change being detected in the form of the impedances consisting of the self-inductances and iron losses of the detection coils, a voltage output from a rectifier is deviated from a real value of the torque and is dependent on the temperature, so that an accurate detection of the torque cannot be made.

In addition, the magnetic characteristic described above is different according to a thermal processing of the magnetostrictive shaft during its manufacture and its magnetic permeability $\mu$ is different. Consequently, a different magnetic permeability causes an ill effect on a magnetic path resistance (so called, magnetic resistance) which is constituted by the iron losses $r1$, $r2$ so that deviations in the sensitivity of each magnetostrictive shaft occur.

SUMMARY OF THE INVENTION

It is therefore an object of the present invention to provide a highly accurate detection and processing circuitry of the torque which can reduce the temperature dependency of the magnetostrictive shaft and detection coils and which can prevent deviations in the sensitivity of the magnetostrictive shaft.

The above-described object can be achieved by providing a torque sensor processing circuitry of a magnetostriction type, comprising: a) at least one detection coil installed on an outer periphery of a magnetostrictive shaft of the torque sensor; b) an oscillator which is so constructed to generate and output a reference waveform; c) an inverting circuit, connected to said oscillator via a resistor, and having a negative feedback circuit connected between an input end thereof and output end thereof, said feedback circuit having the detection coil; d) a phase shift circuit which is so constructed as to output a reference signal whose phase is shifted by a phase difference of ¼ period with respect to the reference waveform derived from said oscillator; e) a detector which demodulates the inverted signal of the inverting circuit on the basis of the reference signal derived from said phase shift circuit; and f) an integrator which integrates the output signal of the detector.

DETAILED DESCRIPTION OF THE PREFERRED EMBODIMENTS

Reference will hereinafter be made to the drawings in order to facilitate a better understanding of the present invention.

Figure 6:
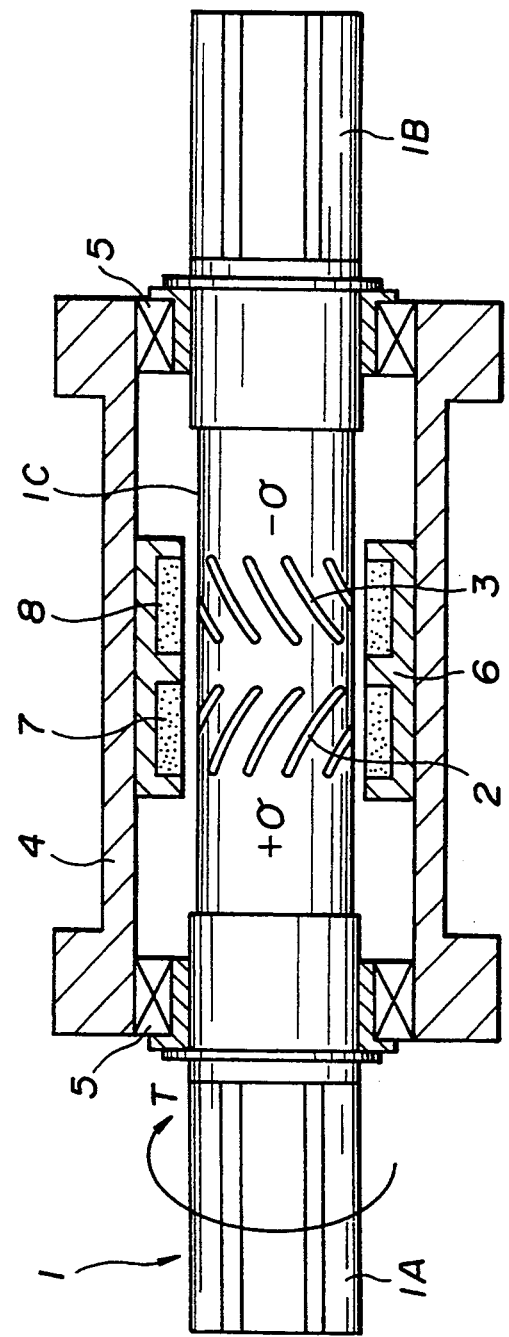
FIG. 6 is a plan view of a magnetostriction type torque sensor used in the preferred embodiments shown in FIGS. 3 and 5.

FIG. 6 shows a structure of a magnetostriction type torque sensor.

As shown in FIG. 6, a magnetostrictive shaft 1 is formed by a magnetostrictive material made of such as Cronium (Cr) Molybdenum (Mo) steel by a thermal (heating) process. The magnetostrictive shaft 1 is installed midway through, e.g., on a propeller shaft. Both ends of the shaft 1 serve as an input mounting portion 1A and an output mounting portion 1B. An intermediate portion of the shaft 1 is constituted by a slit groove forming portion 1C, an outer periphery of the slit groove forming portion 1C having inscribed grooves 2, 3 tilted downward by 45 degrees and upward by 45 degrees, respectively.

In addition, a coil fixing member 4 is rotatably mounted symmetrically with respect to the magnetostrictive shaft 1 via a pair of bearings 5, 5 so as to enclose the outer periphery of the slit groove forming portion 1C. It is noted that the coil fixing member 4 is fixedly attached on a vehicle body (not shown). A ring shaped core member 6 is attached onto an inner periphery of the fixing member 4. Detection coils 7, 8 are installed at portions opposing the slit grooves 2, 3 and provide self inductances L1, L2, respectively.

Figure 1:
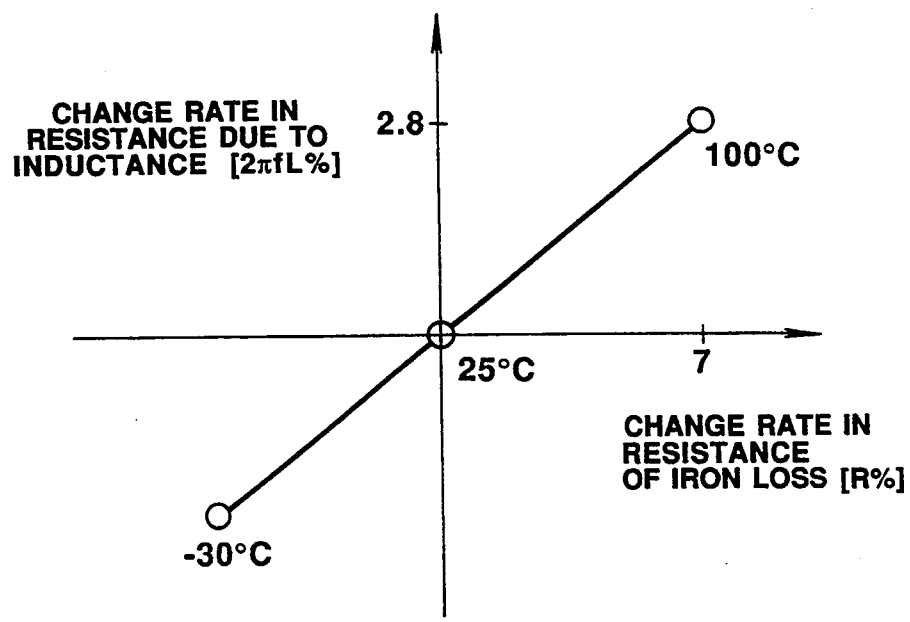
FIG. 1 is a characteristic graph representing a temperature dependency of real parts (iron losses) and imaginary parts (inductances) of impedances of detection coils installed on an outer periphery of one magnetostrictive shaft according to a result of experiment.
Figure 2:
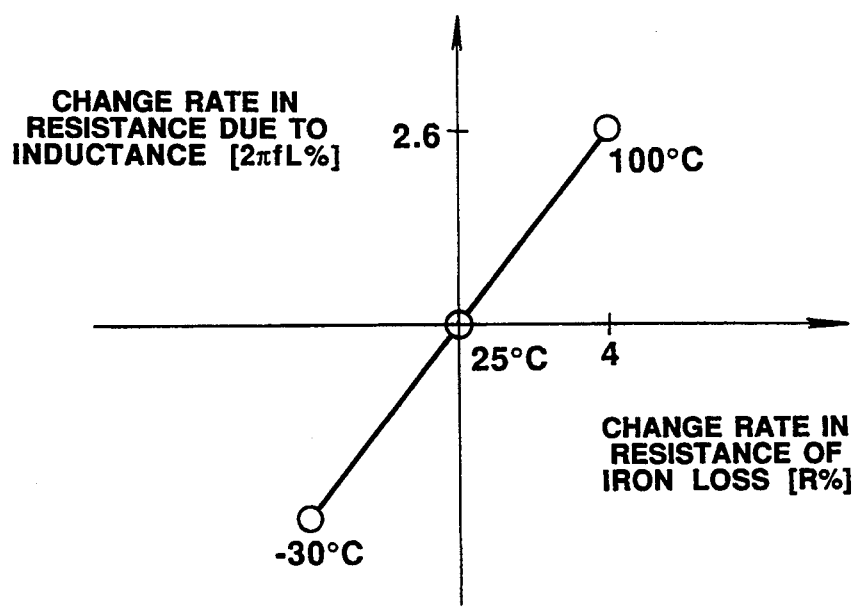
FIG. 2 is a characteristic graph representing a temperature dependency of real parts (iron losses) and imaginary parts (inductances) of impedances of other detection coils installed on an outer periphery of one magnetostrictive shaft according to a result of experiment.

Next, FIG. 1 and FIG. 2 show characteristic graphs of temperature dependent magnetostrictive shaft 1 obtained by means of an experiment.

These characteristic graphs of FIGS. 1 and 2 represent change rates of inductances and iron losses, resistances of the inductances being imaginary parts of the impedances and resistances of the iron losses being real parts of the impedances, the change of the impedances being carried out with the common detection coils installed on the outer peripheries of the two magnetostrictive shafts under the different heating processes and when their surrounding temperature was changed from −30° C. to 100° C.

It is noted that each lateral axis denotes a change rate R % of resistance values of iron losses and longitudinal axis denotes the change rate $2\pi fL$ %.

As appreciated from FIGS. 1 and 2, while the surrounding temperature indicated a temperature in a range from 100° C. to 25° C., the change in the resistances of iron losses occurs from 7% to 4%. However, the change rate of the resistances due to the presence of the inductances $2\pi fL$ is only from 2.8% to 2.6%. Therefore, it was confirmed that the cause of the temperature dependency of impedances was largely contributed to by means of change in resistance values of iron losses.

Hence, the reduction of temperature dependency on the magnetostrictive shaft 1 can be achieved by the elimination of resistances of iron losses, i.e., the real parts of the impedances.

Figure 3:
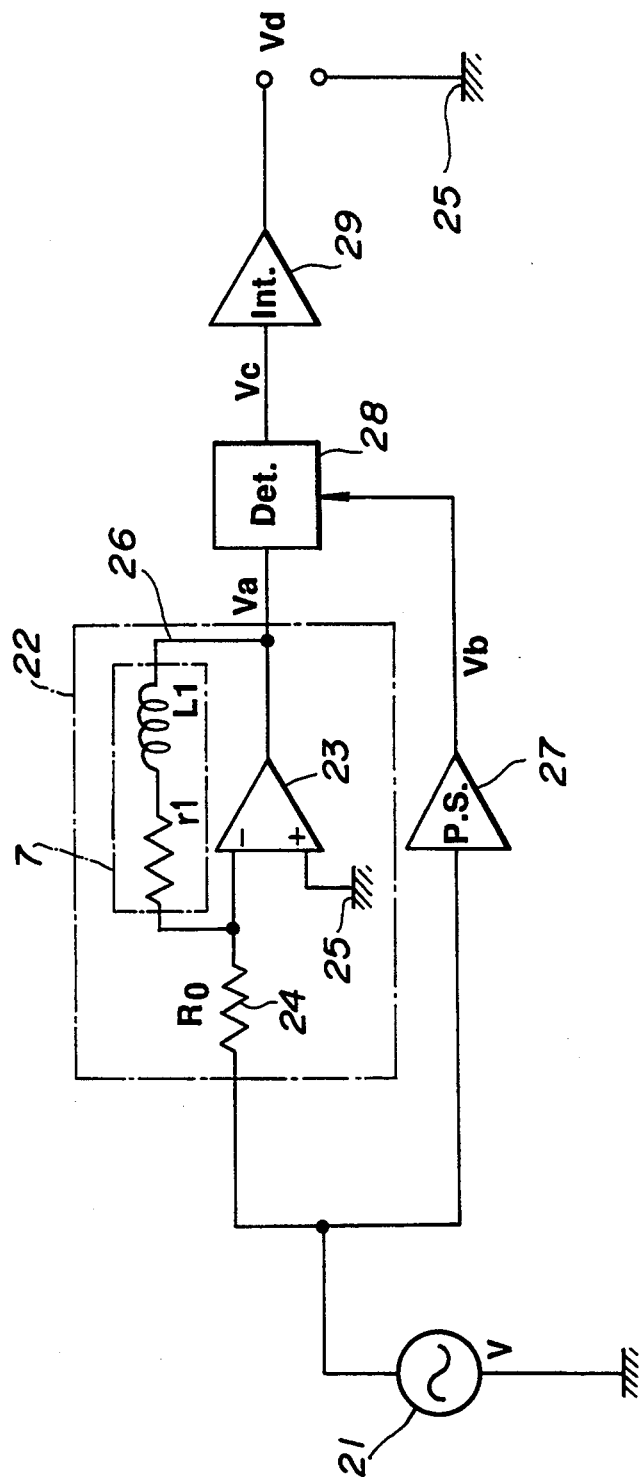
FIG. 3 is a circuit block diagram of a detection and processing circuitry in a first preferred embodiment according to the present invention.
Figure 4:
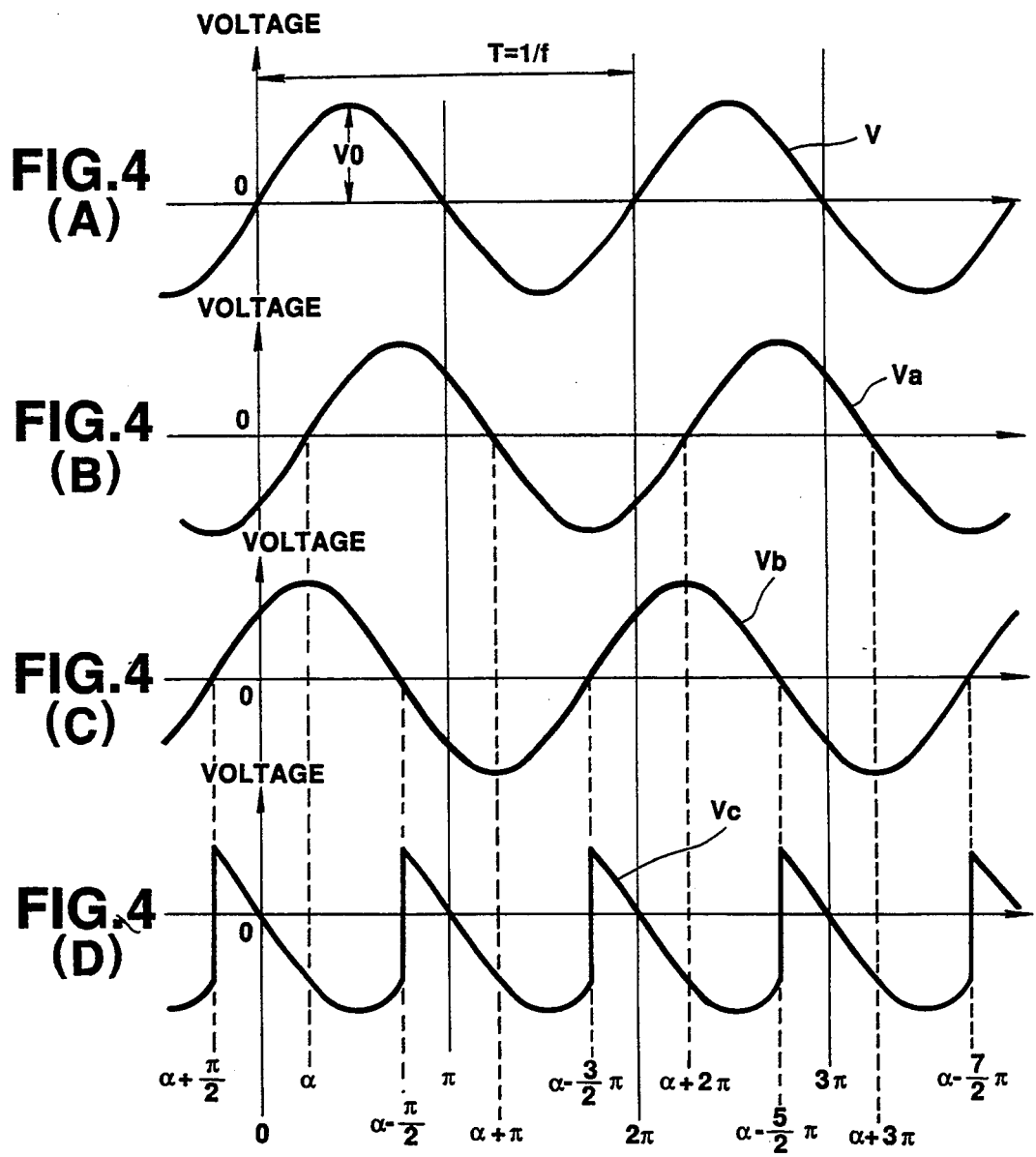
FIGS. 4 (A) through 4 (D) are integrally a timing chart of output signals of respective circuit blocks shown in FIG. 3.

FIG. 3 and FIG. 4 show a first preferred embodiment of the detection and processing circuitry according to the present invention.

In FIG. 3, an oscillator 21 generates and outputs an alternating current (AC) voltage reference waveform shown in FIG. 4(A), having a peak value of Vo and a frequency of f (for example, 30 KHz).

The AC voltage waveform V is represented by:

$$V = Vo \sin\theta \qquad (1)$$

In FIG. 3, numeral 22 denotes an inverting circuit having an operational amplifier 23.

An inverting input end of the operational amplifier 23 is connected to the oscillator 21 via a resistor Ro.

A non-inverting input end of the operational amplifier 23 is grounded. An output end of the operational amplifier 23 is connected to a detector 28 and fedback via a negative feedback circuit 26.

The negative feedback circuit 26, includes the detection coil 7, the detection coil 7 being wrapped around the magnetostrictive shaft 1.

The detection coil 7 is provided with a self inductance L1 and iron loss r1 and its impedance Z1 is represented by:

$$Z1 = \sqrt{r1^2 + (2\pi fL1)^2} \qquad (2)$$

Thus, the output inverted voltage signal Va is represented by (refer to FIG. 4(B)):

$$\begin{aligned}
Va &= -1/Ro \sqrt{r1^2 + (2\pi fL1)^2} \times Vo\sin(\theta + \alpha) \\
\alpha &= \tan^{-1} 2\pi fL1/Ro \\
&= \cos^{-1} Ro/\sqrt{r1^2 + (2\pi fL1)^2} / Ro \\
&= \sin^{-1} 2\pi fL1/\sqrt{r1^2 + (2\pi fL1)^2}
\end{aligned} \qquad (3)$$

Referring back to FIG. 3, a phase shifter 27 is connected between the oscillator 21 and detector 28. The phase shifter 27 includes an operational amplifier with a capacitor and resistor for deviating the AC voltage V from the oscillator 21 by ¼ period, i.e., $\pi/2$) so that the detection voltage Vb as the reference signal in the waveform shown in FIG. 4(C) and its output voltage is transmitted to the detector 28 in the equation (4):

$$Vb = Vo\sin(\theta - \pi/2) \qquad (4)$$

The detector 28 serves to demodulate the inverted voltage Va derived from the inverting circuit 22 by means of the detection voltage Vb. A waveform of Vc shown in FIG. 4(D) is output to an integrator 29.

The integrator 29 is connected to the output end of the above-described detector 28 so as to integrate the voltage Vc in a range from $(\alpha - \pi/2)$ to $(\alpha - 3\pi/2)$ to provide an output voltage Vd.

$$\begin{aligned}
Vd &= \int_{\alpha-1/2\pi}^{\alpha-3/2\pi} -K\sqrt{r1^2 + (2\pi fL1)^2} \times Vo\sin\theta d\theta \\
&= -K\sqrt{r1^2 + (2\pi fL1)^2} \times Vo \times [\cos\theta]_{\alpha-1/2\pi}^{\alpha-3/2\pi} \\
&= -K\sqrt{r1^2 + (2\pi fL1)^2} \times Vo \times (\sin\alpha + \sin\alpha) \\
&= -2K\sqrt{r1^2 + (2\pi fL1)^2} \times Vo \times \sin\alpha
\end{aligned} \qquad (5)$$

In the equation (5), $\alpha$ is expressed using the equation (3) as:

$$\alpha = \sin^{-1} 2\pi fL1/\sqrt{r1^2 + (2\pi fL1)^2} \qquad (6)$$

The output voltage Vd in the equation (6) can also be expressed as:

$$\begin{aligned}
Vd &= -2K\sqrt{r1^2 + (2\pi fL1)^2} \times Vo \times \\
&\quad 2\pi fL1/\sqrt{r1^2 + (2\pi fL1)^2} \\
&= -2K \times (2\pi fL1)
\end{aligned} \qquad (7)$$

wherein K denotes an integration constant.

As appreciated from the equation (7), the output voltage Vd of the integrator 29 has no resistance value which indicates the iron loss of the detection coil 7, the equation (7) indicating the equation which gives only the resistance part of the self inductance L1. Consequently, the real part of the impedance Z1 is eliminated.

Hence, the inverted voltage Va derived from the inverter 22 is integrated in a range from $(\alpha - \pi/2)$ to $(\alpha - 3\pi/2)$ set by means of the detector 28. Hence, the temperature dependency is only on the resistance part of the imaginary part due to the inductance L1 so that the variation in the impedance caused by the temperature can be reduced and the accurate detection of the torque can be achieved.

In the way described above, the first preferred embodiment shown in FIG. 3 can reduce the change rate in the resistance value of the impedance, as shown in FIGS. 1 and 2, since the variation or deviation in the sensitivity of the torque sensor during the different heating process of the magnetostrictive shaft can be absorbed using only the resistance value of the imaginary part of the inductance. The variation in the sensitivity for each magnetostrictive shaft can be reduced so that a resolution of each magnetostrictive shaft can be improved.

As shown in FIG. 3, no bridge circuit disclosed in the U.S. patent application Ser. No. 07/969,056 (which corresponds to the German Patent Application No. P 42 374 16.2) is used so that a trouble of setting the equilibrium state in the bridge circuit can be relieved and so that only one of the pair of detection coils can be used.

Consequently, the circuit structure can become simple.

Figure 5:
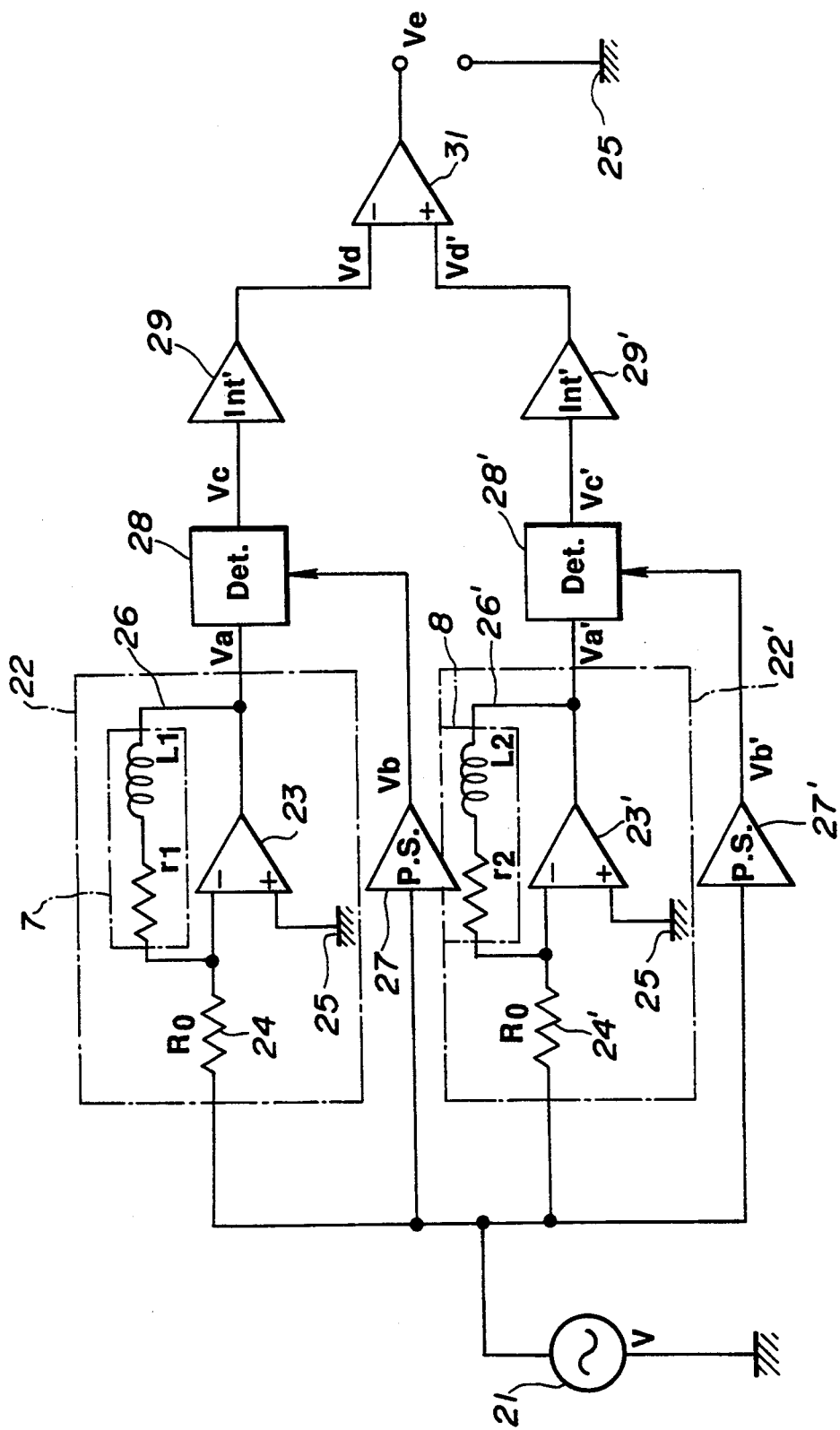
FIG. 5 is a circuit block diagram of a detection and processing circuitry in a second preferred embodiment according to the present invention.

FIG. 5 shows a second preferred embodiment of the detection and processing circuitry of the torque sensor according to the present invention.

In the second preferred embodiment, a pair of processing circuits are installed and each of the pair of the detection coils 7 and 8 is inserted in the inverting circuits 22, 22′. The output voltages from the integrators 29, 29′ are amplified by means of a single differential amplifier 31.

The differential amplifier 31 is constituted by an operational amplifier, the inverting input end thereof being connected to one integrator 29 and the non-inverting input end being connected to the other integrator 29′. The differential amplifier 31 serves to amplify a difference between the output voltages Vd and Vd′ to provide a voltage signal of Ve.

It is noted that a negative feedback circuit 26′ of the other inverting circuit 22′ includes the other detection coil 8 (self inductance is denoted by L2 and iron loss thereof is denoted by r2).

The same effect of the second preferred embodiment shown in FIG. 5 can be achieved.

Furthermore, in the second preferred embodiment shown in FIG. 5, the difference of the output voltages Vd and Vd′ can be calculated and amplified so that the peak value of the voltage signal Ve can be relatively large and a more accurate detection of the torque can be achieved.

Although the pair of phase shift circuits 27, 27′ are installed as shown in FIG. 5, the one phase shift circuit 27, 27′ may be used so that the detection voltage Vb may be transmitted to one detection circuit 28 and the other detection circuit 28′.

The detection coils may be a single or a pair. In the case of the pair of detection coils 7, 8, a circuit which serves not to cancel both outputs of the detection coils may be inserted in series with the negative feedback circuits 26, 26′ of the inverting circuits 22, 22′.

As described hereinabove, since the detection and processing circuitry of the torque sensor includes one detection coil connected between the output side and input side of the inverting circuit, the phase shift circuit which shifts the reference waveform derived from the oscillator by ¼ period (that is to say, π/2) and outputs the shifted reference signal to the detector, the detector modulating the inverted signal of the inverting circuit on the basis of the reference signal of the phase shift circuit, and the integrator which integrates the output signal of the detector, the detection and processing circuitry according to the present invention can reduce or eliminate the resistance value of the iron loss, i.e., the real part of the impedance output from the detection coil installed on the outer periphery of the magnetostrictive shaft and can detect the value of torque from the imaginary part of the inductance of the impedance.

The variation due to the temperature applied around the magnetostrictive shaft and detection coil can be reduced and the accurate detection of torque can be achieved.

Furthermore, the deviation in the sensitivity of the magnetostrictive shaft due to the difference in the heating process can be reduced since only the imaginary part of the impedance of the detection coil which is not so dependent on the change in the temperature is used to detect the torque. Consequently, the sensitivity of the magnetostriction type torque sensor can be improved.

In addition, in the second preferred embodiment, the pair of detection coils and pair of processing circuits are used and output the differential amplified voltage Ve so that the peak value of the torque detection voltage becomes higher and the more accurate detection of the torque can be achieved.

It is noted that the self inductances L1 and L2 of the pair of detection coils 7, 8 in the magnetostrictive shaft 1 shown in FIG. 6 are expressed as:

$L = k \cdot \mu N^2 S/l$;

$\mu$: magnetic permeability,

N: the number of turns of each detection coil,

S: magnetic path cross sectional area, and l: average length of the magnetic path, When a torque T is applied to an input side mounting portion of the magnetostrictive shaft 1 in a direction marked by an arrow of FIG. 6, a slit groove 2 generates a tension stress $+\sigma$ and the other slit groove 3 generates a compressive stress $-\sigma$. If the magnetostrictive shaft 1 is made of a positive strain (magnetostrictive) material, the tension stress $+\sigma$ causes the increment in the magnetic permeability $\mu$ and the compressive stress $-\sigma$ causes decrement in the permeability $\mu$.

The structure of the magnetostriction type torque sensor is exemplified by the U.S. patent application Ser. No. 07/969,056 (which corresponds to the German Patent Application Publication No. DE 42 37 416 A1 which is published on May 11, 1992) (the disclosure of which is herein incorporated by reference).

It will fully be appreciated by those skilled in the art that the foregoing description has been made to the preferred embodiments and various changes and modifications may be made without departing from the scope of the present invention which is to be defined by the appended claims.

What is claimed is:

1. A torque sensor processing circuitry of a magnetostriction type, comprising:
   a) at least one detection coil installed on an outer periphery of a magnetostrictive shaft of the torque sensor;
   b) an oscillator which is so constructed as to generate and output a reference waveform;
   c) an inverting circuit, connected to said oscillator via a resistor, and having a negative feedback circuit connected between an input end thereof and an output end thereof, said feedback circuit having the detection coil;
   d) a phase shift circuit which is so constructed as to output a reference signal whose phase is shifted by a phase difference of ¼ period with respect to the reference waveform derived from said oscillator;
   e) a detector which demodulates an inverted signal Va derived from the inverting circuit on the basis of the reference signal derived from said phase shift circuit; and
   f) an integrator which integrates an output signal of the detector, the integrated output signal of said integrator being related to a direction and a magnitude of a torque applied to the magnetostrictive shaft.

2. A torque sensor processing circuitry of a magnetostriction type as set forth in claim 1, wherein said inverted signal Va of the inverting circuit is expressed as:

$$Va = -1/Ro \sqrt{r1^2 + (2\pi fL1)^2} \times Vo\sin(\theta + \alpha)$$

wherein Ro denotes said resistor of said inverting circuit, r1 denotes a resistance of iron loss of the detection coil and L1 denotes a self inductance of the detection coil, f denotes a frequency of the reference waveform of the oscillator, Vosine denotes the reference waveform voltage derived by said oscillator, and α denotes $$\tan^{-1} 2\pi fL/Ro = \cos^{-1} Ro/\sqrt{r1^2 + (2\pi fL1)^2} =$$

$$\sin^{-1} 2\pi fL1/\sqrt{r1^2 + (2\pi fL1)^2}.$$

3. A torque sensor processing circuitry of a magnetostriction type as set forth in claim 2, wherein an output voltage of the integrator is expressed below:

$$\begin{aligned} Vd &= -2K \sqrt{r1^2 + (2\pi fL1)^2} \times Vo \times \\ & \quad 2\pi fL1/\sqrt{r1^2 + (2\pi fL1)^2} \\ &= -2K \times (2\pi fL1) \end{aligned}$$

wherein K denotes an integration constant.

4. A torque sensor processing circuitry of a magnetostriction type as set forth in claim 3, wherein said integrator carries out a constant integration of the inverted voltage signal of said inverting circuit from a time of $(\alpha - \pi/2)$ to a time of $(\alpha - 3\pi/2)$.

5. A torque sensor processing circuitry of a magnetostriction type as set forth in claim 4, which further includes another detection coil installed on the outer periphery of said magnetostrictive shaft, the other detection coil being inserted in another negative feedback circuit of another inverting circuit having the same structure as the one inverting circuit, another detector of the same structure of the one detector, another integrator of the same structure of the one integrator, and a single differential amplifier which outputs a voltage signal Ve which provides a difference between the one integrated voltage signal Vd of the one integrator and the other integrated voltage signal Vd' from said other integrator.

6. A torque sensor processing circuitry of a magnetostriction type as set forth in claim 5, which further includes another phase shift circuit having the same structure of the one integrator and connected to said one and other detectors.

7. A torque sensor processing circuitry as set forth in claim 6, wherein the magnetostrictive shaft of the torque sensor is installed on a shaft of a power transmission of an automotive vehicle.

8. A signal processing circuit for a torque sensor, comprising:
a) at least one detection coil fixed to an external rigid body, and installed around a magnetostrictive shaft, said magnetostrictive shaft being interposed between ends of a rotating shaft so that its permeability is varied according to a direction and magnitude of the torque applied to the magnetostrictive shaft via the rotating shaft and so that an inductance of said detection coil is accordingly varied;
b) an oscillator which is so constructed as to generate and output a reference waveform having an alternating voltage;
c) an inverting circuit, connected to said oscillator via a resistor and having a negative feedback circuit connected between an input end thereof and an output end thereof, said feedback circuit having the detection coil;
d) a phase shift circuit which is so constructed as to output a reference signal having a phase shifted by a phase difference of ¼ period with respect to the reference waveform derived from said oscillator;
e) a detector to demodulate an inverted signal output from the inverting circuit on the basis of the reference signal derived from said phase shift circuit;
f) an integrator to integrate an output signal of the detector to compensate for an iron loss generated in the detection coil so that an integrated output signal indicates a signal corresponding to the inductance of the detection coil without a presence of the iron loss generated in the detection coil.

* * * * *